United States Patent [19]

Hatta et al.

[11] Patent Number: 5,255,176
[45] Date of Patent: Oct. 19, 1993

[54] CONTROL CIRCUIT FOR AN INVERTER OPERABLE IN AN INDIVIDUAL MODE AND AN INTERCONNECTION MODE

[75] Inventors: Yasunori Hatta; Naoya Eguchi, both of Kanagawa, Japan

[73] Assignee: Fuji Electronic Co., Ltd., Kanagawa, Japan

[21] Appl. No.: 731,879

[22] Filed: Jul. 18, 1991

[30] Foreign Application Priority Data

Jul. 20, 1990 [JP] Japan ................. 2-191968

[51] Int. Cl.$^5$ .................................. H02M 7/44
[52] U.S. Cl. ........................... 363/95; 363/96; 363/98
[58] Field of Search ........................ 363/95, 96, 98

[56] References Cited

U.S. PATENT DOCUMENTS

| | | | |
|---|---|---|---|
| 4,328,454 | 5/1982 | Okuyama et al. | 363/37 |
| 4,367,522 | 1/1983 | Forstbauer et al. | 363/96 |
| 4,800,478 | 1/1989 | Takahashi | 363/98 |
| 4,823,251 | 4/1989 | Kawabata et al. | 363/95 |
| 4,947,310 | 8/1990 | Kawabata et al. | 363/71 |
| 5,041,959 | 8/1991 | Walker | 363/96 |

FOREIGN PATENT DOCUMENTS

0283952 9/1988 European Pat. Off. .
3236071 1/1984 Fed. Rep. of Germany .
59-99969 6/1984 Japan .

Primary Examiner—Steven L. Stephan
Assistant Examiner—Jeffrey L. Sterrett
Attorney, Agent, or Firm—Finnegan, Henderson, Farabow, Garrett and Dunner

[57] ABSTRACT

A control circuit for an inverter for converting DC voltage to AC voltage, operable in an individual mode and an interconnection mode, and including a synchronous compensating circuit in which, when the inverter is operating in a power system synchronous operation mode under control of a synchronous-interconnection control system, a quantity of an instantaneous voltage variation component occurring in the power system is separated, in order to detect respectively, a quantity of the variation of the component in same phase with a reference voltage vector of the output voltage of the inverter, and a quantity of the variation of the component orthogonal to the reference voltage vector. The detected variation quantities are respectively added to the outputs of a voltage adjuster and a phase adjuster in the synchronous-interconnection control system. The circuit is capable of compensating an instantaneous variation of the power system without a decrease of circuit stability.

6 Claims, 4 Drawing Sheets

CONTROL CIRCUIT FOR AN INVERTER OPERABLE IN AN INDIVIDUAL MODE AND AN INTERCONNECTION MODE

BACKGROUND OF THE INVENTION

The present invention relates to a control circuit for a voltage inverter operable in an individual mode in which the inverter converts a DC voltage from a DC source, such as a fuel cell, a solar cell, or a battery, to an AC voltage, and individually transfers the converted AC voltage to an AC load, and in an interconnection mode, in which the inverter power system is interconnected with or incorporated into a power system, the converted AC voltage, together with the power voltage of the power system, is transferred to the load. More particularly, the present invention relates to a control circuit for the voltage inverter, which includes a compensating means for compensating an instantaneous variation of the power system voltage.

The control circuit for the voltage inverter operable in the individual and interconnection modes, comprises a constant voltage control system provided for use in the individual mode, and an effective power control system and a reactive power control system both provided for use in the interconnection mode. Generally, the inverter control circuit is provided with a synchronous-interconnection control system including phase and voltage amplitude adjusters, or an adjuster for adjusting those items of the output voltage. The synchronous-interconnection control system is used for a power system synchronous operation, which is performed when the inverter changes its operation mode from the individual mode to the interconnection mode.

The synchronous-interconnection control system, including the phase and voltage amplitude adjusters, stops those adjusters after the inverter power system is interconnected with the power system, and operates an effective power adjuster of the effective power control system and a reactive power adjuster of the reactive power control system. In the interconnection mode, the synchronous-interconnection control system and the effective and reactive power control systems are selectively changed over before and after the inverter power system is interconnected with the power system.

Figure 4:
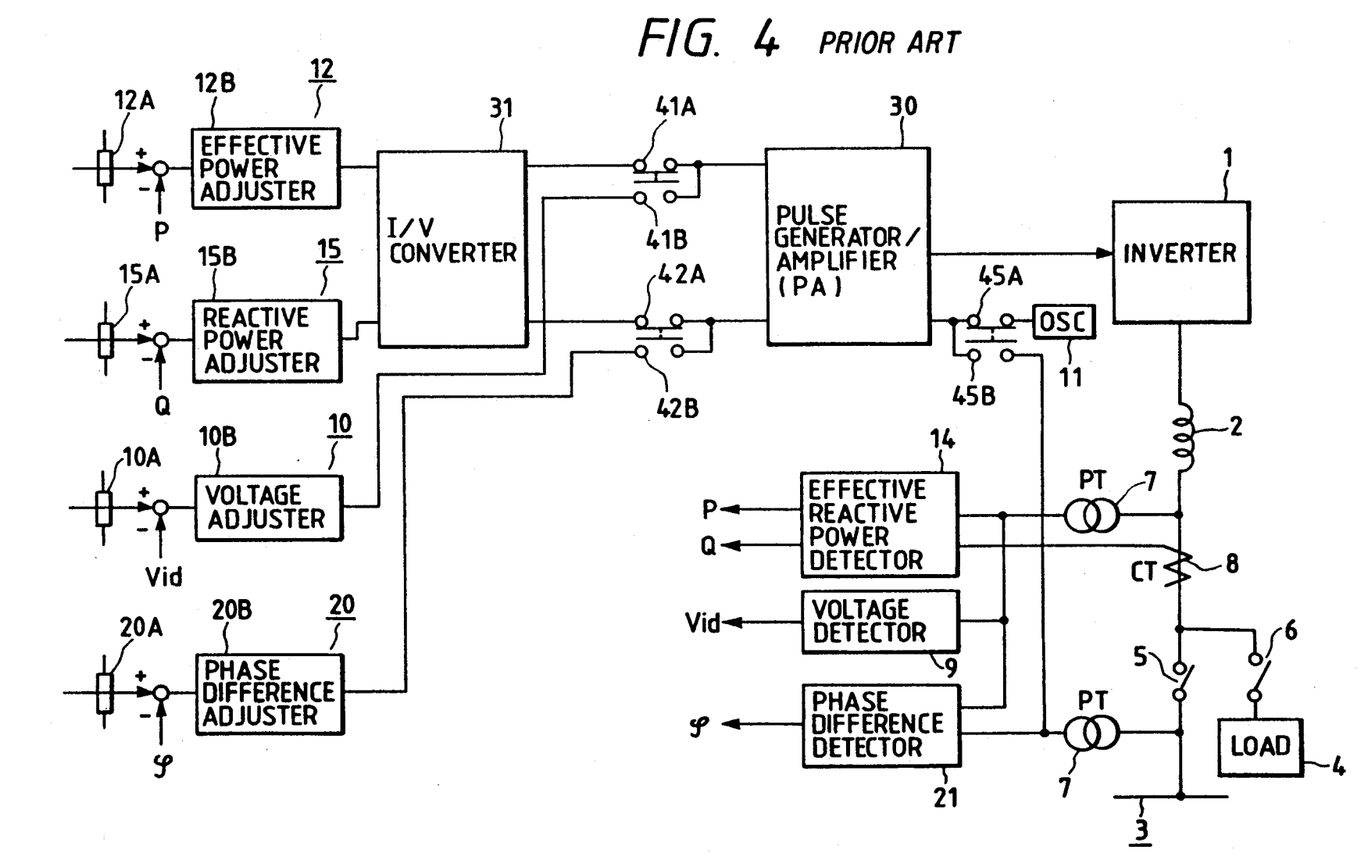
FIG. 4 is a block diagram showing a general circuit arrangement of a conventional control circuit for voltage inverter operation in the individual/interconnection mode.

FIG. 4 is a block diagram showing a general circuit arrangement of the control circuit for voltage inverter operable in the individual and interconnection modes. In FIG. 4, reference numeral 1 designates a self-exciting voltage inverter; 2, an output reactor of the inverter 1; 3, a power system with which the inverter power system is interconnected; 4, a load; 5 a breaker for the interconnection mode; 6, a load breaker; 7, a voltage detect transformer (PT); and 8 a current detect transformer (CT).

An individual operation control system 10 includes a voltage adjuster 10B for adjusting a detection voltage Vid detected by a voltage detector 9 to approach to a value set by a voltage setter 10A. The control system applies the output voltage of the voltage adjuster 10B through a selector 42 to a pulse generation-amplifier (PA) 30, which is provided for applying a striking pulse to the invertor 1. The same applies a fixed frequency signal generated by an oscillator 11 through another selector 45 to the pulse generation-amplifier PA. Consequently, the inverter 1 transfers an AC power of which the reference frequency is the fixed frequency of the oscillator 11, to the load 4 through the load breaker 6.

An interconnected power system in which the power system of the inverter 1 is interconnected, for AC power transmission, with the power system 3, through the breaker 5, comprises an effective power control system 12 including a effective power adjuster 12B, and a reactive power control system 15 including a reactive power adjuster 15B. An effective-reactive power detector 14 receives and separates the AC power into an effective component P and a reactive component Q. The effective power adjuster 12B controls the output voltage of the inverter so as to make the detected effective component P approach to a set value set by an effective power setter 12A. The reactive power control system 15 controls the output voltage of the inverter so as to make the detected reactive component Q approach to a set value set by a reactive power setter 15A. A current/voltage (I/V) converter 31 converts the outputs of each control system into voltages corresponding to the output voltage of the inverter 1. The output voltages of the converter 31 are applied respectively through the selectors 41 and 42, to the pulse generation-amplifier (PA) 30. In this way, the inverter 1 is placed to the interconnection mode. A selector 45 is turned to a contact 45B so that the reference output frequency of the inverter 1 is controlled so as to be equal to the frequency of the power system 3.

A synchronous-interconnection control circuit 20, which is operated when the operation mode of the inverter is changed from the individual mode to the interconnection mode, is made up of the voltage detector 9, the voltage setter 10A, and the voltage adjuster 10B, which are common used with the individual control system 10. The output control signal of the voltage setter 10A is supplied through the contact 41B to the pulse generation-amplifier 30. A phase difference $\phi$ between the inverter output voltage and the power system voltage is detected by a phase difference detector 21. A phase-difference adjuster 20B, contained in the synchronous-interconnection control circuit, controls the reactive component of the inverter 1 so as to make the phase difference $\phi$ approach to a value that is set by a phase-difference setter 20A (normally, it is set at 0). The output signal of the phase-difference adjuster 20B is supplied to the pulse generation-amplifier 30, through the contact 42B of the selector 42.

In the individual mode, the breaker 5 is opened, and the respective selectors are turned to the contacts 41B, 42B, and 45A. Under this condition, an AC power of which, the voltage is controlled by the voltage adjuster 10B and the frequency is controlled by the oscillator 11, is supplied through the load breaker 6 to the load. The synchronous-interconnection control is performed in a manner that the selector 45 is turned to the contact 45B, the amplitude (instantaneous value) and the phase of the output voltage of the inverter 1 are made to approach to those values of the voltage of the power system 3, by the synchronous-interconnection control circuit 20, and thereafter, the breaker 5 is closed. The interconnection power system operation is performed by activating the effective power control system 12 and the reactive power control system 15 and turning the selectors to the contacts 41A and 42A.

Most of the interconnected power systems in which the inverter 1, which converts a DC voltage from a DC source, such as a fuel cell, a solar cell, or a battery, to an AC voltage, is operated while being interconnected with or incorporated into the power system, have each a relatively small power capacity. Because of this fact, an instantaneous variation of the voltage vector of the power system is large when the load is connected to and disconnected from the power system. The control circuit of the inverter, containing a proportional integration adjuster (PI adjuster) as a main component, is based on the fixed value control technique which operates to keep a set value at a fixed value against incoming disturbance. In the inverter control circuit, if, to improve the follow-up performance, the proportional compensation quantity is excessively increased by increasing the feedback quantity of the PI adjuster, the fixed value control becomes instable, so that the output of the inverter constantly varies.

SUMMARY OF THE INVENTION

The present invention is to provide a control circuit for inverter, which is capable of compensating an instantaneous variation of the power system without decreasing of the stability of the control circuit upon the synchronous-interconnection mode being in advance of interconnection mode.

To solve the above-mentioned problems, the present invention provides a control circuit for an inverter operable in an individual mode and an interconnection mode, having an individual operation control system in which a control system for a voltage inverter for converting DC voltage to AC voltage, controls AC voltage in a constant-voltage and individually supplies the converted AC voltage to a load, a synchronous-interconnection control system for controlling the amplitude and phase of the output voltage of the inverter for synchronization them with those in a power system to incorporate the inverter into the power system; and effective and reactive power control systems for controlling the effective component and the reactive component of an electric power transferred between the power system and the inverter interconnected with the power system, thereby to perform the interconnection mode operation; the control circuit serving also as a voltage adjuster for making a constant-voltage control or a synchronous control of the AC voltage, characterized in that the control circuit comprises a synchronous compensating circuit in which, when the inverter is operating in a power system synchronous operation mode under control of the synchronous-interconnection control system, a quantity of an instantaneous voltage variation occurring in the power system, is separated into (a) a quantity of the variation of the component in same phase with a reference voltage vector of the output voltage of the inverter, and (b) a quantity of the variation of the component orthogonal to the reference voltage vector, in order to detect these variations respectively, and the detected variation quantities are respectively added to the outputs of a voltage adjuster and a phase adjuster in the synchronous-interconnection control system.

For the interconnection mode operation, the control circuit for the inverter comprises an interconnection mode compensating circuit, in which the output voltage of the inverter, which is operating in the interconnection mode under control of the effective power control system and the reactive power control system, is stored as an internal vector. A quantity of an instantaneous variation in the voltage of the power system is detected in terms of a quantity of a variation of the component in phase with the internal vector and a quantity of a variation of the component orthogonal to the internal vector, and the detected variation quantities are respectively added to the voltage-converted outputs of the effective power control system and the reactive power control system. The control circuit for the inverter may comprise a synchronous-interconnection mode compensating circuit in which the output voltage of the inverter, which is operating in the power system synchronous-interconnection mode or the interconnection mode, is stored as an internal vector. A quantity of an instantaneous variation in the voltage of the power system is detected in terms of a quantity of a variation of the component in phase with the internal vector and a quantity of a variation of the component orthogonal to the internal vector, and the detected variation quantities are respectively added to the outputs of the effective power control system and the reactive power control system or the outputs of the synchronous-interconnection control system.

The first aspect of the present invention includes a synchronous compensating circuit. In the compensating circuit, when the inverter is operating in the power system synchronous operation mode, which is followed by the interconnection mode, an instantaneous voltage variation occurring in the power system is detected in terms of the component in phase with a reference voltage vector as the vector of the output voltage of the inverter, and the variation of component orthogonal to the reference voltage vector. The detected variations are respectively added to the outputs of a voltage adjuster and a phase adjuster in the synchronous-interconnection control system. With such an arrangement, a striking pulse applied to the inverter can be compensated by transferring the instantaneous voltage variation in the power system to the input of the pulse generation-amplifier. The amplitude and the phase of the output voltage of the inverter, when the power system synchronous-interconnection is set up, can be compensated following the instantaneous voltage variation in the power system. Further, the synchronous-interconnection control system does not need to follow the instantaneous voltage variation in the power system. Therefore, the fixed value control function, which is the function proper to the PI adjuster, can be stably maintained.

In the second aspect of the present invention, a quantity of an instantaneous variation in the voltage of the power system, when the inverter is operating in the interconnection mode, is detected in terms of a quantity of a variation of the component in phase with the internal vector and a quantity of a variation of the component orthogonal to the internal vector, and the detected variation quantities are respectively added to the outputs of the effective power control system and the reactive power control system. Therefore, with a response delay of the synchronous signal generator (PLL circuit) containing a memory element, an instantaneous variation of the voltage vector is compared with the internal vector before the variation occurs, thereby to detect a quantity of the variation. The suppression of the variation in the power system voltage leads to lessening of the adjust processing load of the PI adjuster in the reactive power control system. Therefore, a stable output control by the inverter with the fixed value control function, which is the function proper to the PI adjuster, can be secured.

In the third aspect of the present invention, a quantity of an instantaneous variation in the voltage of the power system is detected in terms of a quantity of a variation of the component in phase with the internal vector and a quantity of a variation of the component orthogonal to the internal vector, and the detected variation quantities are respectively added to the outputs of the effective power control system and the reactive power control system or the outputs of the synchronous-interconnection control system. The compensating circuit thus arranged controls the output voltages of both the control systems according to an instantaneous variation in the power system voltage. That is, the control circuit can control, in accordance with an instantaneous variation of the power system voltage, both the inverter output voltage at the time of setting up the synchronous operation mode, and the inverter output voltage at the time of setting up the interconnection mode. Accordingly, a stable fixed-value control can be secured while lessening the control processing loads of both the control systems.

DESCRIPTION OF PREFERRED EMBODIMENTS

Preferred embodiments of the present invention will be described with reference to the accompanying drawings.

Figure 1:
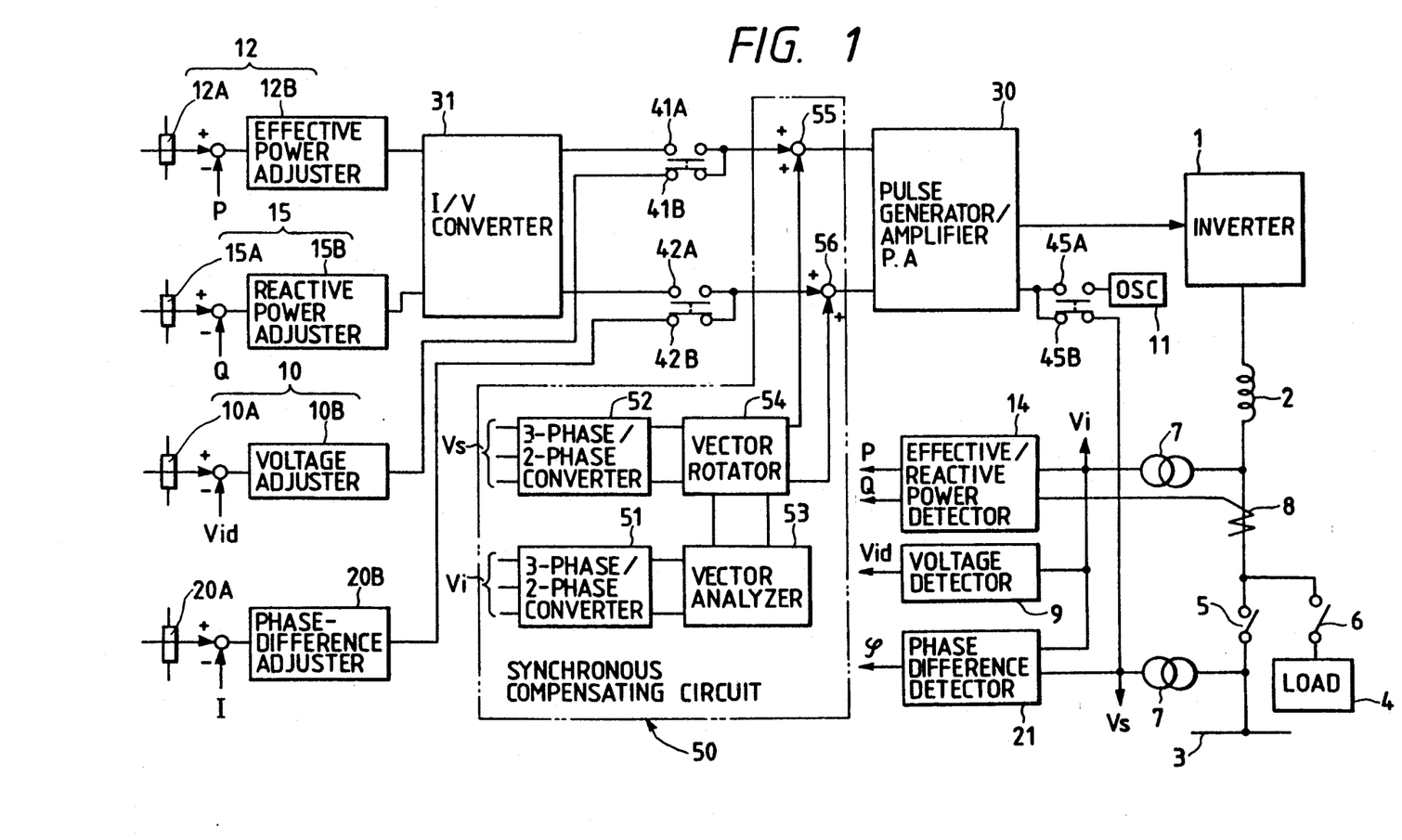
FIG. 1 is a block diagram showing a control circuit for an inverter operable in the individual mode and the interconnection mode, which is an embodiment of a first aspect of the present invention.

FIG. 1 is a block diagram showing a control circuit for an inverter operable in the individual mode and the interconnection mode, which is an embodiment of a first invention of the present invention. In the figure, like reference symbols are used for designating like or equivalent portions in the drawing showing the conventional circuit, for simplicity. It is assumed that the load breaker 6 is open, the selectors 41, 42, and 45 are turned to the B contacts, and the power system synchronous operation is being performed under control of the voltage adjuster 10B and the phase-difference adjuster 20B, which serve as the PI adjuster in the synchronous-interconnection control system. A synchronous compensating circuit 50 is made up a pair of 3-phase/2-phase converters 51 and 52, a vector analyzer 53, a vector rotator 54, an adder 55, and another adder 56. The 3-phase/2-phase converter 51 separates the output voltage Vi of the inverter 1 into an in-phase component and an orthogonal component. The 3-phase/2-phase converter 52 likewise separates the voltage Vs of the power system 3 into an in-phase component and an orthogonal component. The vector analyzer 53 is provided for preparing a reference vector of the inverter voltage on the basis of the output voltage of the converter 51. When the power system voltage Vs instantaneously varies, the vector rotator 54 separates a quantity of a variation of the output voltage of the converter 52 with respect to the reference vector into two components, an in-phase component, which is in phase with the reference vector, and an orthogonal component, which is orthogonal to the reference vector. The adder 55 adds the detected in-phase component to the output voltage of the voltage adjuster 10B. The adder 56 adds a variation quantity of the detected orthogonal component to the output voltage of the phase-difference adjuster 20B.

In the control circuit including the synchronous compensating circuit 50 thus arranged, if an instantaneous variation occurs in the amplitude and the phase of the voltage Vs of the power system 3, the voltage adjuster 10B and the phase-difference adjuster 20B, which constitute the PI adjuster, cannot follow a changing speed of the instantaneous variation. The amplitude and the phase of the output voltage Vi of the inverter 1 become different from those of the power system voltage Vs of the power system 3, respectively. The synchronous compensating circuit 50 detects the instantaneous variation with respect to the output voltage vector of the inverter. Therefore, the in-phase component and the orthogonal component, that are detected, are differences between the changing speed of the instantaneous variation and a response speed of the voltage adjuster 10B, and between the changing speed and a response speed of the phase-difference adjuster 20B. The differences are added to the output voltages of the adjusters. Accordingly, the output voltage of the inverter 1 varies in synchronism with the instantaneous variation of the voltage of the power system. As a result, a stable synchronous-interconnection state is set up, and a stable synchronous operation is performed while placing the voltage adjuster and the phase-difference adjuster in a stable fixed-value control, which is the function proper to the PI adjuster.

Figure 2:
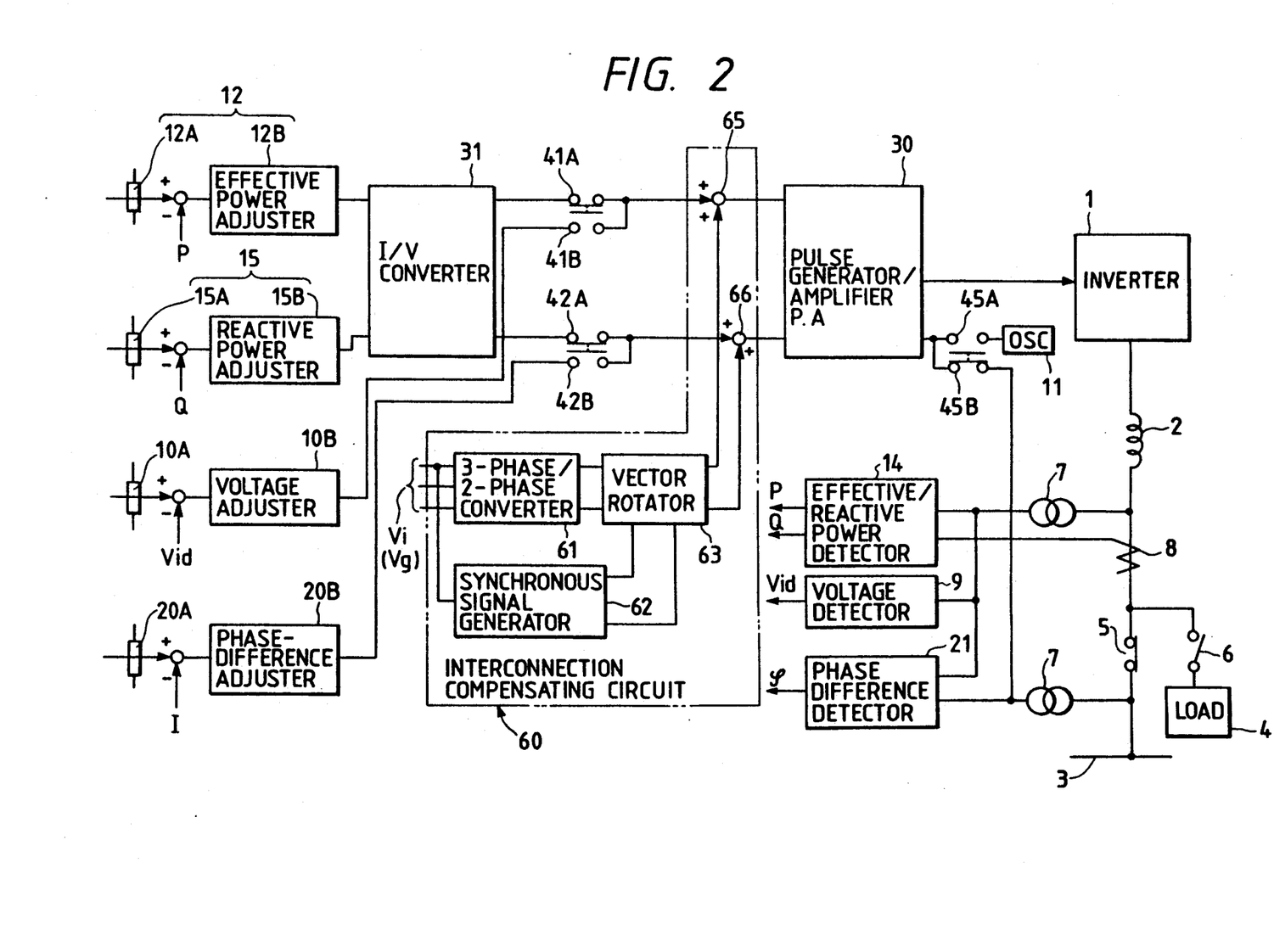
FIG. 2 is a block diagram showing a control circuit according to an embodiment of a second aspect of the invention.

FIG. 2 is a block diagram an embodiment of a second aspect of the present invention. The illustration shows a state of a control circuit for an invertor operation in the interconnection mode, in which the load breaker 6 is open, the selectors are turned to the contacts 41B, 42B, and 45B, and the inverter 1 is operating while being incorporated into or interconnected with the power system 3, under control of the effective power adjuster 12B and the reactive power adjuster 15B. In an interconnection mode compensating circuit 60 illustrated, the power system voltage is temporarily stored in a power system synchronous signal generator (PLL circuit) 62, and it is read out thereof, whereby to generate an internal reference vector with a predetermined delay time. A 3-phase/2-phase converter 61 and a vector rotator 63, by using the internal reference vector, cooperate to separate a variation of the power system voltage into two components, an in-phase component, which is in phase with the internal reference vector, and a orthogonal component. The detected in-phase component is added, by an adder 65, to the output voltage of the effective power adjuster 12B at the input of the pulse generation-amplifier 30. A variation of the reactive component is added, by another adder 66, to the output voltage of the reactive power adjuster 15B. The output voltage of the control circuit is compensated at the input of the pulse generation-amplifier 30 as a pulse generating means. Irrespective of the load follow-up performances of the effective power control system 12 and the reactive power control system 15, the control circuit thus arranged can control the power supplied to and from the inverter 1, following an instantaneous variation of the power system voltage. Further, the control circuit can lessen an adjust processing load, caused by the instantaneous variation, upon the effective power adjuster 12B and the reactive power adjuster 15B, which serve as the PI adjustor.

Figure 3:
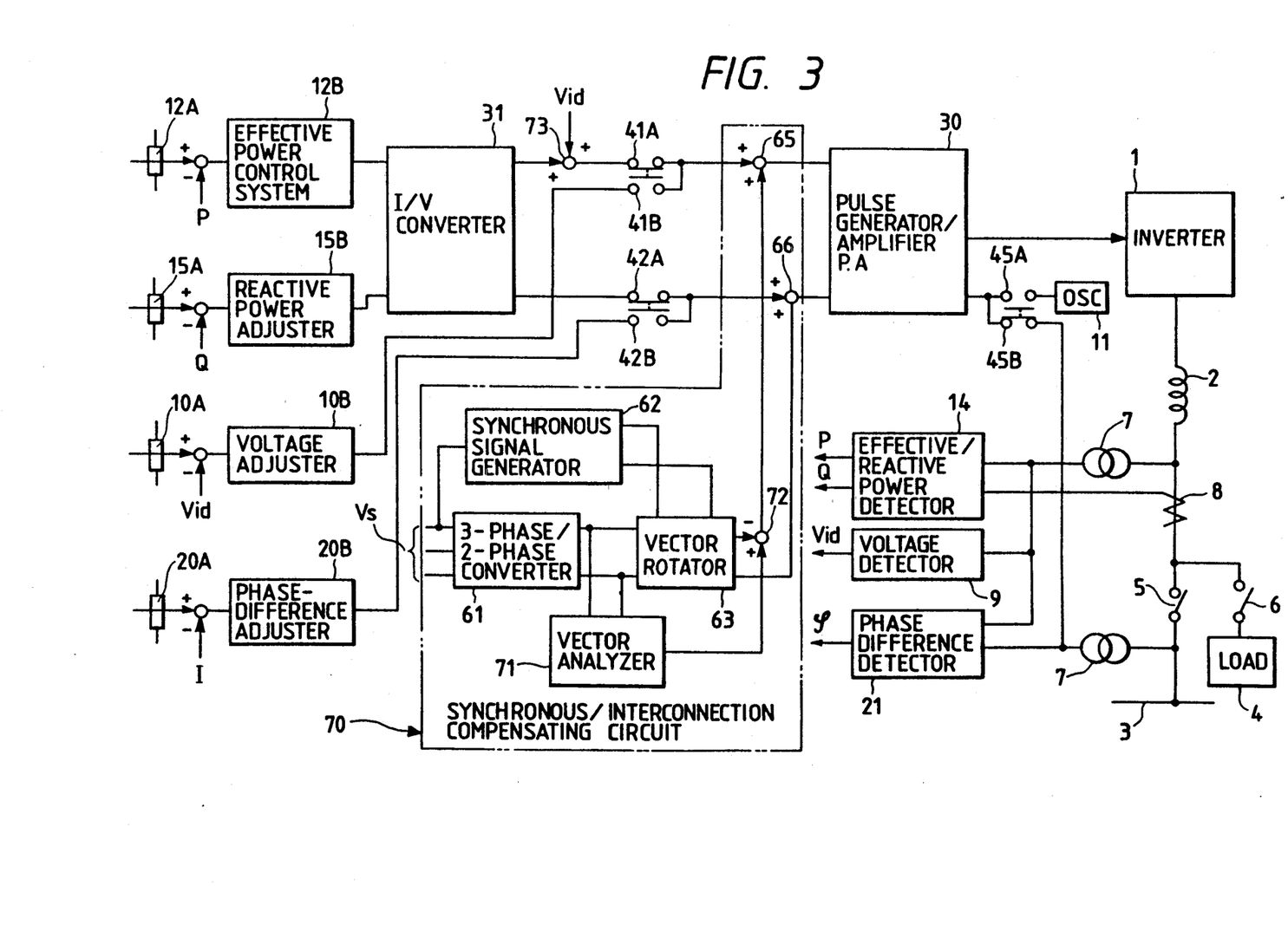
FIG. 3 is a block diagram showing a control circuit according to an embodiment of a third aspect of the invention.

FIG. 3 is a block diagram showing a control circuit according to an embodiment of a third aspect of the present invention. In the figure, a synchronous-interconnection mode compensating circuit 70 includes a vector analyzer 71 and a subtractor 72, in addition to those components in the interconnection mode compensating circuit 60 of FIG. 2, viz., the 3-phase/2-phase converter 61, the power system synchronous signal generator 62, and the vector rotator 63. In the control circuit thus arranged, the output voltage of the vector analyzer 71 is subtracted from the in-phase component detected by the vector rotator 63. A variation in the power system voltage is detected in terms of a quantity of a variation of the in-phase component and a quantity of a variation of the orthogonal component. Only the variation quantities of the in-phase component and the orthogonal component are added to the output voltage of the control circuit at the input of the pulse generating-amplifier 30. The compensating circuit is applicable for both the synchronous operation mode and the interconnection mode. In the interconnection mode, the output voltage Vid of the voltage detector 9 is compensated by an adder 73 provided at the output of the I/V converter.

As seen from the foregoing description, the first aspect of the present invention includes a synchronous compensating circuit. In the compensating circuit, an instantaneous voltage variation occurring in the power system is detected in terms of the component in phase with a reference voltage vector as the vector of the output voltage of the inverter, and the orthogonal component orthogonal to the reference voltage vector. The detected variations are respectively added to the outputs of a voltage adjuster and a phase adjuster in the synchronous control system. With such an arrangement, the output voltage of the voltage inverter can be controlled following instantaneous variations of the amplitude and phase of the power system voltage. The synchronous interconnection can be smoothly performed without disturbing the power system. The voltage adjuster and the phase adjuster, which make up the PI adjuster, when operate, do not need to follow the instantaneous variation. Therefore, the synchronous operation can be stably performed under the fixed-value control which is the control characteristic essential to the PI adjuster.

In the second aspect of the invention, the control circuit includes a interconnection compensating circuit. In the compensating circuit, a quantity of an instantaneous variation in the voltage of the power system, when the inverter is operating in the interconnection mode, is detected in terms of a quantity of a variation of the component in phase with the internal vector and a quantity of a variation of the component orthogonal to the internal vector, and the detected variation quantities are respectively added to the I/V converted outputs of the effective power control system and the reactive power control system. Therefore, the effective power and the reactive power the inverter receives and transmits can be compensated at the input of the pulse generation-amplifier, which generates a firing pulse. With the compensation, the variation in the power system voltage is suppressed to lessen the adjust processing load of the PI adjuster in the reactive power control system. The operation of the interconnection mode can stably be performed by making full use of the fixed-value control of the PI adjuster.

In the third aspect of the invention, the compensating circuit is arranged such that a quantity of an instantaneous variation in the voltage of the power system is detected in terms of a quantity of a variation of the component in phase with the internal vector and a quantity of a variation of the component orthogonal to the internal vector, and the detected variation quantities are respectively added to the outputs of the synchronous-interconnection control system and the interconnection operation control system. Accordingly, the single compensating circuit is applicable for both the synchronous operation mode and the interconnection mode, thereby simplifying the circuit construction.

What is claimed is:

1. A control circuit for a voltage inverter for converting DC voltage to AC voltage operable in an individual mode and an interconnection mode, said control circuit comprising an individual control system in which the AC voltage is controlled in a constant-voltage and individually supplied to a load; a synchronous-interconnection control system for controlling an amplitude and a phase of an output voltage of said voltage inverter to synchronize the amplitude and phase with those in a power system and incorporating said inverter into the power system; and an effective power control system and a reactive power control system for controlling the effective component and the reactive component of an electric power transferred between the power system and said inverter interconnected with the power system, thereby to perform the interconnection mode operation; said control circuit serving also as a voltage adjuster for making a constant-voltage control or a synchronous control of said AC voltage, said control circuit further comprising:

a synchronous compensating circuit in which, when said inverter is operating in a power system synchronous operation mode under control of said synchronous-interconnection control system, a quantity of an instantaneous voltage variation occurring in the power system is detected in terms of a quantity of the component in phase with a reference voltage vector as the vector of the output voltage of said inverter, and a quantity of the component, orthogonal to said reference voltage vector, is detected, and the detected variation quantities are respectively added to the outputs of a voltage adjuster and a phase adjuster in said synchronous-interconnection control system.

2. A control circuit as claimed in claim 1, wherein said synchronous compensating circuit comprises:

first 3-phase/2-phase converter for separating the output voltage of the voltage inverter into an in-phase component and an orthogonal component;

second 3-phase/2-phase converter for separating the voltage of the power system into an in-phase component and an orthogonal component;

vector analyzer for preparing a reference vector of the inverter voltage on the basis of an output voltage of the first 3-phase/2-phase converter;

vector rotator for separately outputting a quantity of a variation of the output voltage of the second converter in the in-phase component and the orthogonal component;

first adding means for adding an output of the vector rotator of the in-phase component to the output voltage of the voltage adjuster; and second adding means for adding an output of the vector rotator of the orthogonal component to the output voltage of the phase adjuster.

3. A control circuit for a voltage inverter for converting DC voltage to AC voltage operable in an individual mode and an interconnection mode, said control circuit comprising an individual control system in which the AC voltage is controlled in a constant-voltage and individually supplied to a load; a synchronous-interconnection control system for controlling an amplitude and a phase of an output voltage of said voltage inverter to synchronize the amplitude and phase with those in a power system and incorporating said inverter into the power system; and an effective power control system and a reactive power control system for controlling the effective component and the reactive component of an electric power transferred between the power system and said inverter interconnected with the power system, thereby to perform the interconnection mode operation; said control circuit serving also as a voltage adjuster for making a constant-voltage control or a synchronous control of said AC voltage, said control circuit further comprising:

an interconnection mode compensating circuit in which the output voltage of said inverter, which is operating in the interconnection mode under control of said effective power control system and said reactive power control system, is stored as an internal vector, a quantity of an instantaneous variation in the voltage of the power system is detected in terms of a quantity of a variation of the component in phase with said internal vector and a quantity of a variation of the component orthogonal to the internal vector, and the detected variation quantities are respectively added to the voltage-converted outputs of said effective power control system and said reactive power control system.

4. A control circuit as claimed in claim 3, wherein said interconnection compensating circuit comprises:

synchronous signal generation for temporarily storing a power system voltage to generate an internal reference vector with a predetermined delay time;

3-phase/2-phase converter for separating the voltage of the power system into an in-phase component and an orthogonal component;

vector rotator for separately outputting a quantity of a variation of the output voltage of the converter in the in-phase component and the orthogonal component;

first adding means for adding an output of the vector rotator of the in-phase component to the output voltage of the effective power control system; and second adding means for adding an output of the vector rotator of the orthogonal component to the output voltage of the reactive power control system.

5. A control circuit for a voltage inverter for converting DC voltage to AC voltage operable in an individual mode and an interconnection mode, said control circuit comprising an individual control system in which the AC voltage is controlled in a constant-voltage and individually supplied to a load; a synchronous-interconnection control system for controlling an amplitude and a phase of an output voltage of said voltage inverter to synchronize the amplitude and phase with those in a power system and incorporating said inverter into the power system; and an effective power control system and a reactive power control system for controlling the effective component and the reactive component of an electric power transferred between the power system and said inverter interconnected with the power system, thereby to perform the interconnection mode operation; said control circuit serving also as a voltage adjuster for making a constant-voltage control or a synchronous control of said AC voltage, said control circuit further comprising:

a sychronous-interconnection mode compensating circuit in which the output voltage of said inverter, which is operating in the power system synchronous-interconnection mode or the interconnection mode, is stored as an internal vector, a quantity of an instantaneous variation in the voltage of the power system is detected in terms of a quantity of a variation of the component in phase with said internal vector and a quantity of a variation of the component orthogonal to the internal vector, and the detected variation quantities are respectively added to the outputs of said effective power control system and said reactive power control system or the outputs of said synchronous-interconnection control system.

6. A control circuit as claimed in claim 5, wherein said synchronous-interconnection compensating circuit comprises:

synchronous signal generation for temporarily storing a power system voltage to generate an internal reference vector with a predetermined delay time;

3-phase/2-phase converter for separating the voltage of the power system into an in-phase component and an orthogonal component;

vector rotator for separately outputting a quantity of a variation of the output voltage of the converter in the in-phase component and the orthogonal component;

vector analyzer for preparing a reference vector of the inverter voltage on the basis of an output voltage of the 3-phase/2-phase converter;

subtractor for subtracting the output voltage of the vector analyzer from the in-phase component of the output of the vector rotator;

first adding means for adding an output of the subtractor to the output voltage of the effective power control system;

second adding means for adding an output of the vector rotator of the orthogonal component to the output voltage of the reactive power control system.

* * * * *

UNITED STATES PATENT AND TRADEMARK OFFICE
CERTIFICATE OF CORRECTION

PATENT NO. : 5,255,176

DATED : October 19, 1993

INVENTOR(S) : Yasunori Hatta et al.

It is certified that error appears in the above-indentified patent and that said Letters Patent is hereby corrected as shown below:

On the title page, change "Electronic" to --Electric--.

Signed and Sealed this

Eleventh Day of April, 1995

Attest:

BRUCE LEHMAN

*Attesting Officer*     *Commissioner of Patents and Trademarks*